United States Patent [19]

Risi et al.

[11] Patent Number: 4,601,148

[45] Date of Patent: Jul. 22, 1986

[54] MODULE FOR WALLS AND FREE STANDING STRUCTURE

[76] Inventors: Angelo Risi; Antonio Risi, both of P.O. Box 370, Gormley, Canada, L0H 1G0

[21] Appl. No.: 507,505

[22] Filed: Jun. 24, 1983

[51] Int. Cl.$^4$ .............................................. E04B 1/04
[52] U.S. Cl. ...................................... 52/284; 52/589; 52/593
[58] Field of Search ................. 52/182, 189, 602, 603, 52/284, 286, 300, 605, 589, 591, 593, 594, 421, 581; 217/65; 261/DIG. 72

[56] References Cited

U.S. PATENT DOCUMENTS

| 390,175 | 9/1888 | Lee | 52/284 |
| 689,523 | 12/1901 | Trumbull | 52/593 |
| 1,072,230 | 9/1913 | Howard | 52/293 |
| 3,269,125 | 8/1966 | Moore | 52/581 |
| 4,173,287 | 11/1979 | Kumakawa | 217/65 |

FOREIGN PATENT DOCUMENTS

| 817358 | 10/1951 | Fed. Rep. of Germany | 52/421 |
| 947736 | 1/1949 | France | 52/300 |
| 1174042 | 11/1958 | France | 52/594 |
| 520221 | 4/1940 | United Kingdom | 52/300 |
| 536434 | 5/1941 | United Kingdom | 52/439 |

Primary Examiner—James L. Ridgill, Jr.
Attorney, Agent, or Firm—Weldon F. Green

[57] ABSTRACT

A hollow module useful for a retaining wall structure or the like defined by an upstanding surrounding wall formation presenting front, rear and opposed side faces and having generally planar upper and lower surfaces and a substantially constant wall thickness throughout the extent of any given face, the lower planar surface in the regions of the opposed side faces presenting at least a pair of opposed depending lug formations projecting therebelow of dimensions such that when measured in the front to rear direction the extent of same are always less than the front to rear extent of the opposed side faces so as to define with the lower planar surface recess formations for selective registration over the upper planar surfaces of other like or compatible modules whereby such modules are selectively interlockingly interengaged; and wherein suitable slabs are provided with depending lug formations projecting therebelow for disposition upon upper planar surfaces of such modules with the lug formations projecting therewithin and securing the slabs and modules against separation.

6 Claims, 7 Drawing Figures

MODULE FOR WALLS AND FREE STANDING STRUCTURE

FIELD OF INVENTION

This invention relates to improvements in hollow modules or units with open tops useful in themselves singly or in groups as enclosures for soil to serve as planters or when arranged together with other like or compatible modules or units and mounted upon a suitable footing and in courses one upon the other and securely anchored in place by depositing earth or fill within the modules serve as a retaining wall or embankment or other useful or decorative structure in a landscaped setting.

OBJECTS OF THIS INVENTION

One very important object of this invention is to provide a versatile hollow module or unit which of itself will have sufficient breadth and mass as is required to serve as a planter or as a footing or wall unit and is interlockingly interengageable with like or compatible superimposed modules or units so that in combination an improved stable retaining wall or other load bearing structure can be established.

More particularly, it is an object of this invention to provide an improved precast concrete hollow module or unit which is selectively interlockingly interengageable one with the other in alternative dispositions so as to establish a variety of stable supporting or free standing structures.

Still another important object is to provide such hollow module or unit which in combination with other like or compatible modules or units are readily secured against separation or displacement over a range of alternative groupings whereby requisite stability required by municipal regulations can be demonstrated and acceptance assured.

It is another object of this invention to provide a novel hollow module or unit which can be readily combined with a cover or slab which registers upon the open top thereof to serve as a seat, a stairtread in a staircase or as a platform.

It is also an important object to provide such hollow module or unit in a fundamental configuration readily adaptable to precast concrete moulding techniques and of proportions which can be readily handled as well as transported.

Another very important object is to provide a module or unit which offers a variety of attractive or pleasing arrangements enabling one to achieve in any given setting a certain style or distinctiveness that commands attention and therefore likely to commend itself to architects, landscape gardeners or other designers in rendering a proposal or layout for all manner of domestic or commercial sites.

Still another very important object is to provide a novel hollow module or unit which in assembly in a selected precise interlocking interengagement with other like modules automatically gives rise to a retaining wall having the requisite angle of inclination from the vertical so as to fall within the controlling specifications or regulations of the municipality, province or state.

FEATURES OF THE INVENTION

One very important feature of this invention resides in providing a module or unit in the form of a hollow body defined by an upstanding wall formation or rectilinear outline presenting front and rear faces and opposed side faces with generally planar upper and lower surfaces and having a substantially constant wall thickness throughout the extent of any given wall face, the lower planar surface in each of the regions of the opposed side faces presenting opposed depending lug formations projecting therebelow of dimensions such that when measured in the front to rear direction the extent of same are always less than the front to rear extent of the opposed side faces, thereby defining with the lower planar surface recess formations for registration upon the upper planar surface of another like or compatible module or modules, so that the modules can be interlockingly interengaged.

More particularly, according to the invention in the preferred embodiment the wall thickness of the module is constant throughout and the depending lug formations in the region of the front face are separated therefrom a distance of up to the module wall thickness and in the region of the rear face are separated therefrom forwardly thereof a distance up to twice the module wall thickness less the first mentioned distance such that the depending lug formations will snugly register within a like or compatible module or modules when the lug formations are so oriented and presented to the upper planar surface thereof.

Further, according to the invention in the preferred embodiment at least two pairs of opposed depending lug formations project below the lower planar surface in each of the regions of the opposed side faces, each pair of opposed lug formations being separated by a pair of like opposed recesses, each of a dimension of the order of twice the module wall thickness whereby such recess formations when so oriented can embrace abutting walls of two like or compatible modules over their respective upper planar surfaces and secure same against displacement in one direction.

Still more particularly, in the preferred embodiment of the invention the hollow module has a rectilinear configuration and in plan view has an outer perimeter and an inner perimeter of parallelogrammatical configuration uniformly separated so as to establish the constant wall thickness throughout, with the lower planar surface of such hollow module in each of the regions of the opposed side faces presenting at least a front and rear pair of opposed depending lug formations projecting therebelow and extending in a direction front to rear define a vertical plan of symmetry extending front to rear, such front and rear pair of opposed depending lug formations define with the lower planar surface of the aforementioned regions a central recess formation having a dimension of the order of twice the wall thickness and in the region of the front face the depending lug projections are spaced therefrom a distance when measured in front to rear direction less than or equal to the module wall thickness, with the rear pair of depending lugs spaced forwardly from the rear face a distance when measured in the front to rear direction twice the module wall thickness less the aforementioned distance from the front face of the front pair of depending lug formations.

By so selecting such spacings and dimensions for the depending lug formations, when like or compatible hollow modules are superimposed upon groupings of such modules disposed in a lower course so that one face of one module is presented to another face of another module in abutment or in selected spaced apart relation interengaging relationships are established thereby securing the module grouping or structure against separation in one direction while shiftable over a range of positions in another direction whereby variations in the support structure erected can be achieved.

Still more particularly, by establishing through the dimensions of the depending lug formations a precise overlapping of modules in the superior course to the modules in the inferior course a precise inclination of the structure is automatically established as the modules are laid one upon the other to fall within the acceptable range of the controlling specifications or regulations where such structure serves, as a retaining wall.

It is also a feature to provide a slab formation or element for disposition upon the upper planar surface of such modules to establish therewith a supporting surface such slab including lug formations projecting therebelow and so spaced apart as to register within the wall formation of one or more modules or span abutting wall formations of such module and thereby secure same together.

DRAWINGS

These and other objects and features will become apparent upon reading the following description in conjunction with the sheets of drawings in which.

DESCRIPTION OF THE PREFERRED EMBODIMENT

The hollow module or unit 10 embodying the invention illustrated in FIGS. 1 to 4 inclusive takes the form of a hollow prism and includes a front face 12, rear face 14 and spaced opposed side faces 16 and 18 respectively.

Figure 1:
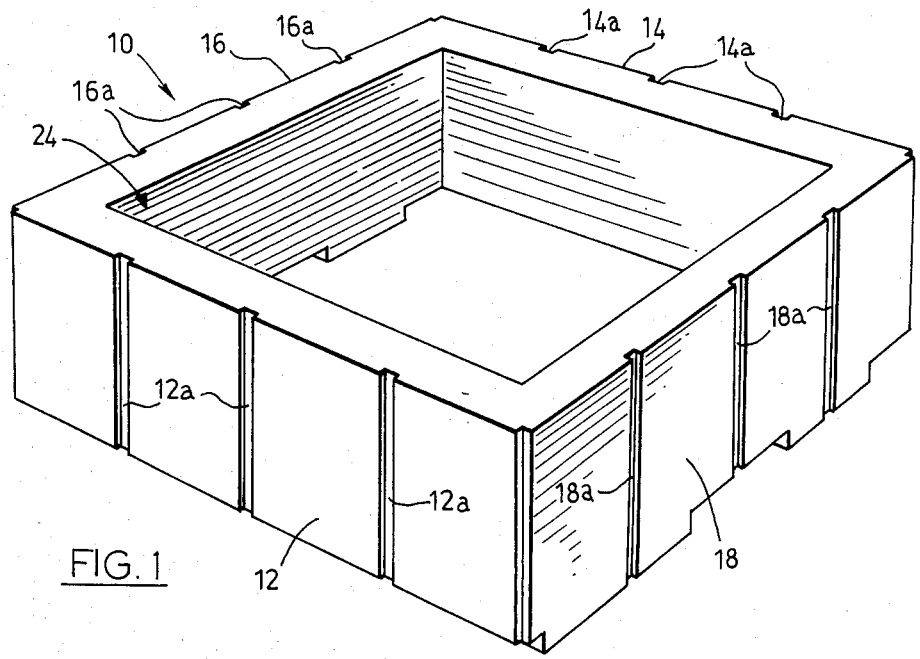
FIG. 1 is a perspective view of the preferred embodiment of a hollow prismatic module made in accordance with the invention taken from a point to the right and upwardly of the front wall thereof.
Figure 2:
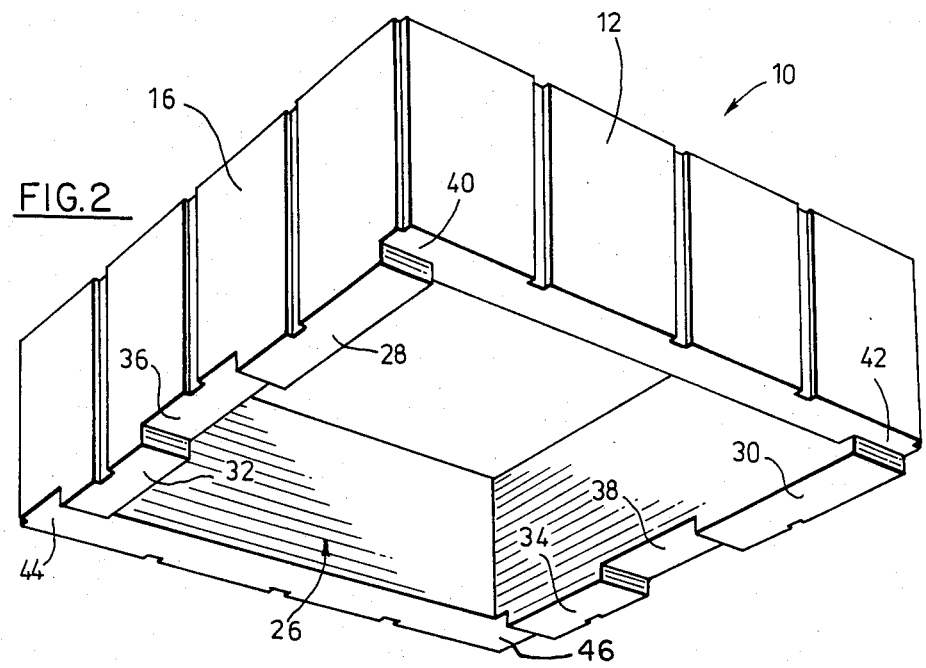
FIG. 2 is a perspective view of the module of FIG. 1 taken from a point to the left and downwardly of the front wall thereof.
Figure 3:
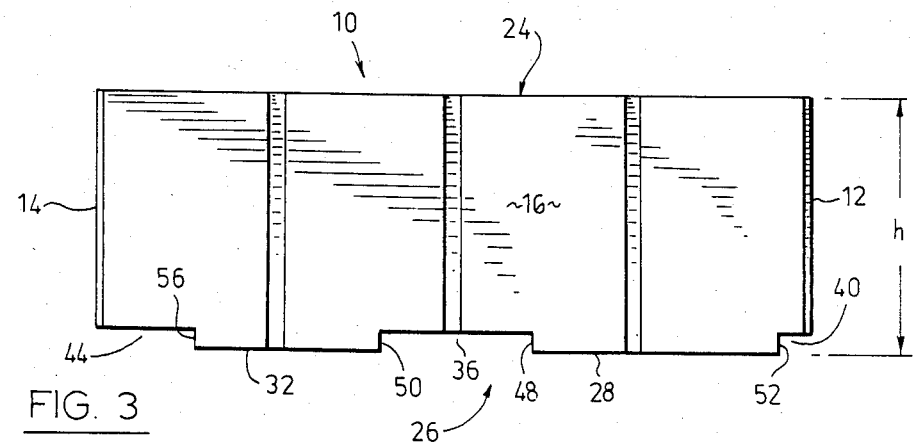
FIG. 3 is a side elevational view taken from the right of the module of FIG. 1.
Figure 4:
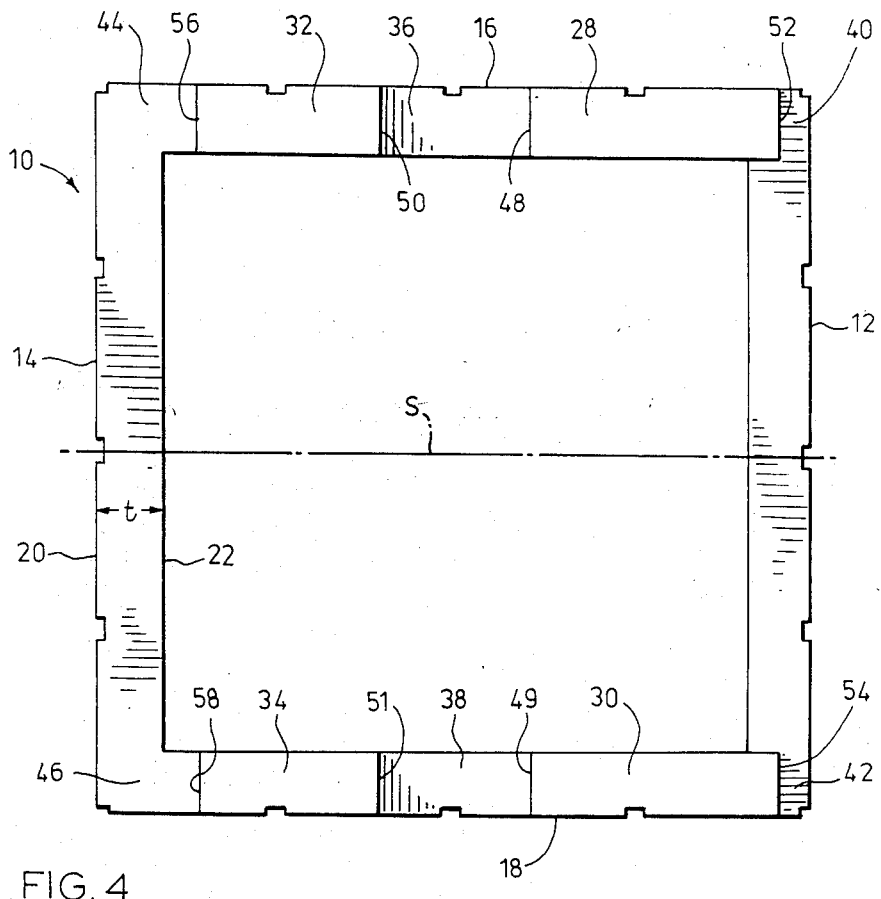
FIG. 4 is a bottom plan view of the module of FIGS. 1 to 3, inclusive, showing the vertical plan of symmetry extending front to rear.
Figure 5:
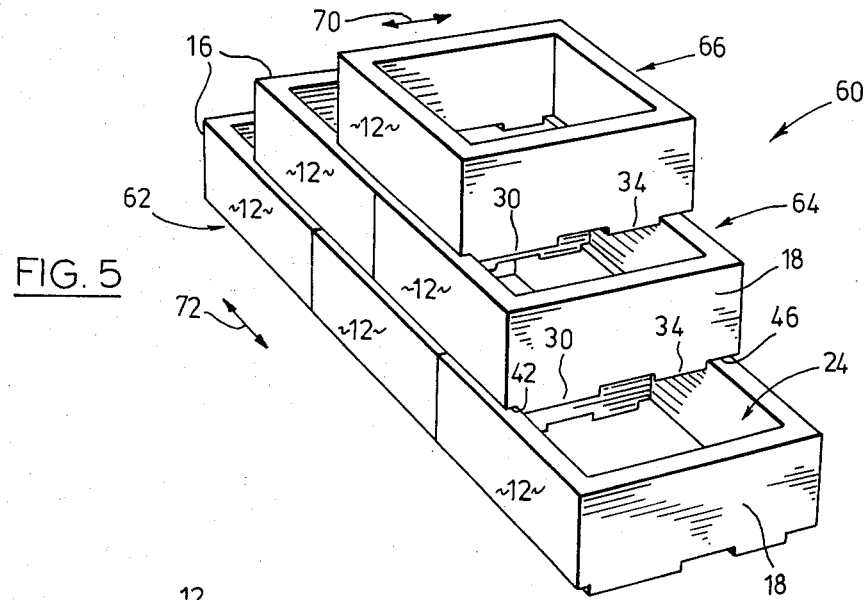
FIG. 5 is a perspective view of an assembly of several modules of the structures of the modules of FIGS. 1 to 4 inclusive arranged in accordance with one preferred method of placement so as to establish a retaining wall structure.
Figure 7:
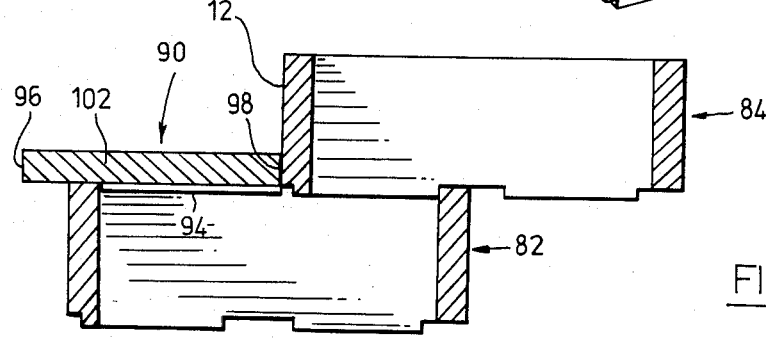
FIG. 7 is a vertical cross-sectional view taken along the lines 7—7 of the structure of FIG. 6.
Figure 6:
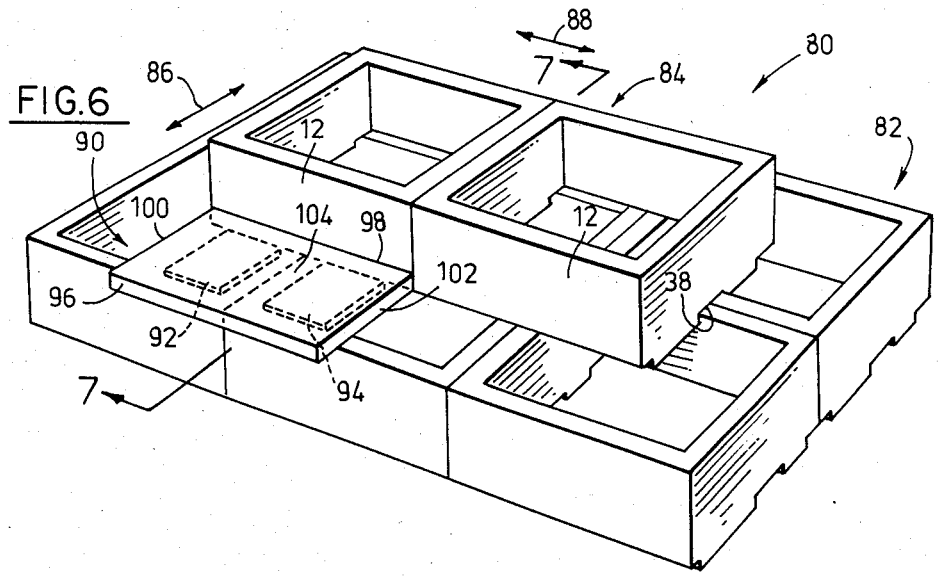
FIG. 6 is an alternative assembly of several modules of FIGS. 1 to 4 inclusive in accordance with another preferred method of placement shown in perspective and constituting a free standing structure which includes in combination slab elements serving as a support surface.

Each face in FIGS. 1 to 4 is provided with spaced apart decorative grooves 12a, 14a, 16a and 18a respectively, the surfaces however can be plain as depicted in FIGS. 5, 6 and 7 or given other surface treatments for aesthetic purposes throughout this description whether with decorative grooves or plain surfaces modules 10 are located as the same.

According to this preferred embodiment, hollow prismatic module 10 in the bottom plan view illustrated in FIG. 4 is seen to have an outer perimeter 20 of square configuration and an inner perimeter 22 of like configuration but of lesser perimetral extent and uniformly separated throughout from said outer perimeter 20 a selected distance designated "t" thereby establishing a substantially uniform wall thickness for the hollow module throughout.

Upper and lower surfaces 24, 26 of hollow prismatic module 10 are planar. Lower surface 26 has in the region of opposed side faces 16, 18 opposed depending lug formations including a like or matching front pair 28, 30 and a like or matching rear pair 32, 34 projecting therebelow so as to define a vertical plan of symmetry, designated "S", extending front to rear.

Front pair of depending lug formations 28, 30 are separated from the rear pair 32, 34 by opposed like recesses 36, 38 which when measured in the front to rear direction are of the order of twice wall thickness "t".

Moreover in this preferred embodiment the front pair 28, 30 of opposed depending lug formations in the region of the front face 12 are separated therefrom by opposed like or matching recess formations 40, 42 a distance when measured in the front to rear direction of the order of one-half the wall thickness "t".

Accordingly in this embodiment the rear pair of opposed depending lug formations 32, 34 in the region of the rear face 14 are spaced forwardly therefrom a distance of the order of 1½ times the wall thickness "t" when measured in the front to rear direction thereby defining opposed like or matching recess formations 44, 46.

Front and rear pair of opposed depending lug formations 28, 30, 32, 34 all have outer surfaces coplanar to the respective outer surfaces of opposed side faces 16, 18 and in the preferred embodiment inner surfaces coplanar to the inner surfaces of the respective walls.

Lug formations 28, 30, 32, 34 in the preferred embodiment have a constant depth dimension in that they extend downwardly an equal distance from the lower planar surface 26 of module 10 in each of the regions of the opposed side faces 16, 18. This feature ensures stability when the module is used as a footing for the composite structure detailed in FIG. 5 of the drawings and in FIGS. 6 and 7 of the drawings.

Recess formations 36, 38, 40, 42 and 44, 46 as indicated are all bounded uppermost by the lower planar surface 26 of prismatic module 10 which surface 26 in all composite structures is adapted to register upon the upper planar surface 24 of like or compatible modules arranged in a lower or inferior course as will be demonstrated.

Moreover, the end walls 48, 50 and 49, 51 of recess formations 36, 38 are adapted to extend in close proximity and contact the opposed inner wall surfaces of the abutting modules of lower or inferior courses, with surfaces 52, 54 of recess formations 40, 42 and surfaces 56, 58 of recess formations 44, 46 also being adapted to extend in close proximity and contact the inner wall surfaces of the respective modules of the lower or inferior courses as likewise will be demonstrated.

RETAINING WALL STRUCTURE

The composite structure illustrated in FIG. 5 demonstrates the utility of module 10 as a component of a retaining wall structure which is generally indicated at 60.

The lowermost course 62 of retaining wall 60 is comprised of like modules 10 disposed in side face 16 to side face 18 abutting relation, with front faces 12 and rear faces 14 arranged in alignment.

This lower course 62 is adapted to be mounted upon a suitable footing, not illustrated, either crushed stone or poured concrete if desired, with each module 10 anchored in place by depositing crushed stone, suitable earth, fill or concrete mix therewithin.

It will be understood that each module has the attribute of a crib structure with the wall presenting the front face 12 tied to the wall presenting the rear face 14 by the spaced opposed side walls presenting the side faces 16 and 18 respectively. So considered each module in itself constitutes a very stable structural unit for retaining wall or like construction.

The second or superior course 64 is derived from like modules 10, so oriented that forward recess formations 40, 42 register or seat with upon the upper planar surfaces 24 of adjacent lower modules 10 in the regions of their front faces 12 and recesses 44, 46 of the modules 10 of superior course 64 register or seat upon the upper planar surfaces 24 of adjacent lower modules 10 in the regions of their rear faces 14.

Likewise, in the third course 66 and all succeeding courses which are derived from like modules 10 the same relationships as have been detailed in connection with the second and first courses of modules 10 can be established.

It will be observed in connection with the structure 60 illustrated in FIG. 5 that the front faces 12 of the second course 64 of modules 10 are stepped back from the front faces 12 of the lowermost course 62 of modules 10 a selected distance of the order of one-half the thickness "t" of the module wall.

By selecting a particular height dimension "h" and a particular wall thickness dimension "t" for module 10 an appropriate inclination from the vertical can be automatically established upon the erection of such structure as is depicted in FIG. 5.

It is to be noted that in the arrangement proposed the end walls 52, 54 of recess formations 40, 42 and the end walls 56, 58 of the recess formations 44, 46 contact the inner surfaces respectively of the walls presenting the front and rear faces 12, 14 of lower course modules 10.

Accordingly in this arrangement the position of the superior modules 10 are fixed in relation to the inferior modules 10 in the front to rear direction throughout all levels or courses and with the structure automatically assuming a predetermined or selected inclination depending upon the selected height dimension and the selected thickness dimension, as earlier outlined.

It is of course within the framework of this proposal that the front pair of lug formations 28, 30 can be spaced from the front face 12 a lesser distance than one-half the wall thickness "t" or a greater distance up to wall thickness "t" to provide a range in the inclination of the composite structure, with the rear pair of depending lug formations, 32, 34 likewise being spaced at a greater or lesser distance from rear face 14 respectively to sustantially secure the superimposed modules against displacement in the front to rear direction as indicated by arrow 70.

It will also be understood having regard to the structure revealed by FIG. 5 that all of the modules in the superior courses 64, 66 and above are displaceable or can slide upon the upper planar surfaces 24 of the respective modules 10 of the lower courses in the side to side direction as indicated by arrow 72 up to the limit position when projecting lug formations 28, 30 and 32, 34 contact the inner surface of the walls presenting side faces 14 and 16 respectively.

When the position of the superior modules 10 is established they can then be filled if desired with soil or crushed stone or the like and so firmly anchored in position.

It is to be understood from FIG. 5 that the wall structure 60 partly defined by interengaging modules 10 is to be extended in either direction side to side and in a direction upwardly to a selected height to establish the requisite wall or embankment.

It will also be appreciated that as viewed in FIG. 5 exposed modules at the end of the retaining wall can be filled with garden soil and serve as planters for flowers, shrubs, cacti or receptacles for decorative boulders, stones or the like.

FREE STANDING STRUCTURES

The structure 80 illustrated in FIG. 6 is derived from like modules 10.

The lower course 82 of structure 80 is comprised of six such modules 10 arranged with their respective side and rear and front faces in contact.

Each module 10 of the second or superior course 84 of structure 80 spans four of the lower course modules 10 with the central opposed recess formations 36 and 38 of each module embracing from above the double wall thickness of the abutting rear and front faces of the lower modules 10 as illustrated.

Thus, it can be seen that the superior course modules 10 secure the modules 10 of the lower course against separation front to rear in the direction denoted by the arrow 86.

The lower course modules 10 are adapted to be anchored by depositing fill or crushed stone or earth therewithin or by small boulders for use as planters or decorative displays.

Further, it will be understood that modules 10 of the superior course can be displaced in a side to side direction of the arrow 88 with the central recess formations 36 and 38 still engaging or embracing the abutting wall formations of the modules therebelow up to a limit position when depending lug formations contact the inner surfaces of the side walls of modules 10 of the lower course 82 when the superior modules are shifted or displaced to the right or to the left as viewed in FIG. 6, but always constraining the modules 10 of the lowermost course against separation.

STRUCTURES INCLUDING SUPPORTING SURFACES

A typical slab 90 illustrated in FIGS. 6 and 7 is provided with depending lug projections 92 and 94 shown in broken outline in FIG. 6 which projections 92, 94 are spaced inwardly from the front and rear faces 96, 98 and from the side faces 100, 102 and from each other as at 104 so as to project within the open tops of abutting modules 10 of lower course 82 with the spacings so dimensioned as to capture the abutting side walls of the respective modules therebetween and secure the units against further separation.

Thus it will be observed that the slab 90 rests securely upon the upper planar surfaces of the respective abutting modules 10 of lower course 82, the dimensions of the slab being selected in this proposal such that the rear surface 98 thereof abuts front face 12 of the module 10 of the superior course as particularly shown in FIG. 7.

It will be obvious to persons skilled in this field that other slab dimensions can be selected to cover the open tops of particular modules in their entirety or only partly in a like or similar manner and with such modified slab units composite structures such as staircases can be erected or the slabs installed to serve as seats or platforms all in the manner prescribed.

ALTERNATIVE STRUCTURES

It will be understood that the modules 10 can be so arranged in the superior courses of the structures as to interlock with the inferior courses in the manner illustrated by FIG. 5 and by FIG. 6 to achieve still further variation in dispositons of the interlocking modules beyond those illustrated.

It will be understood further that variations or modifications can be undertaken in the module illustrated and described by those persons skilled in the art and as well in the composite structures derived therefrom without departing from the spirit and scope of the invention as defined by the appended claims.

What I claim is:

1. A building module in the form of a hollow body defined by an upstanding surrounding wall formation of rectilinear outline, said hollow body presenting opposed front and rear outer and inner faces and opposed side outer and inner faces and having a generally planar upper and lower surface and a substantially constant wall thickness throughout the extent of any given face, a pair of matching depending lug formations presented respectively below the said lower planar surface in each of the regions of said opposed side faces only and wherein each said depending lug formation in the region of said front outer face is rearwardly separated therefrom an extent measured rearwardly along said lower planar surface less than the thickness between said front outer and inner faces so as to define a first recess formation and in the region of said rear outer face is forwardly separated therefrom an extent measured forwardly along said lower planar surface greater than the thickness between said rear inner and outer faces so as to define a second recess formation and with each said lug formation having an extent front to rear corresponding to the separation between said inner front and inner rear faces whereby when the lower surface of one such module is presented to the upper surface of another such module one of said depending lug formations so presented thereto is registrable within the other such module to extend between the front inner and rear inner faces and with said first and second recess formations engaging the upper planar surface thereof in offset aligned mating relation therewith and displaceable thereover throughout a range of offset aligned mating positions between the opposed inner side faces thereof.

2. A building module according to claim 1 wherein each said depending lug formation includes a third recess formation located intermediately thereof and opening downwardly from said lower planar surface and of an extent measured front to rear of the order of twice any one of said wall thicknesses.

3. A building module according to claim 1 wherein a vertical plane bisecting said opposed side faces bisects said third recess formations located intermediately of said lug formations.

4. A building module according to claims 1, 2 or 3 wherein the wall thickness throughout the extent of one given face is equal to the wall thickness throughout the extent of every other given face.

5. A building module according to claims 1, 2 or 3 wherein said module has a vertical plane of symmetry extending front to rear.

6. A building module according to claims 1, 2 or 3 wherein said inner and outer side faces and the corresponding surfaces of said lug formations depending therebelow extend in coplanar relation front to rear.

* * * * *